May 7, 1940.   S. MANDL   2,200,133
METHOD OF AND MEANS FOR STRAIGHTENING OUT DEFORMED
AUTOMOBILE BODIES AND THE LIKE
Filed Jan. 21, 1937   5 Sheets-Sheet 1

Inventor:
Sigmund Mandl
By:
Attys.

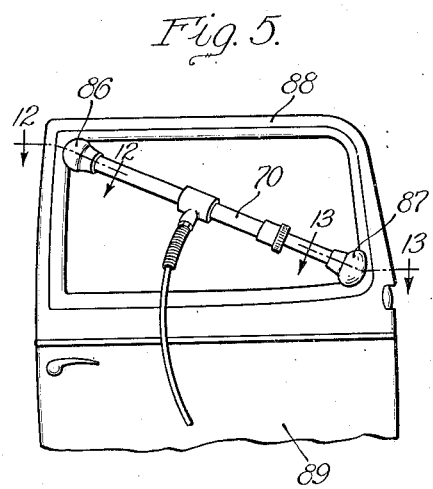
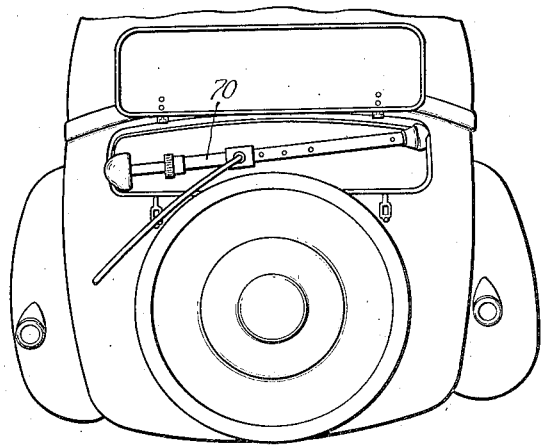
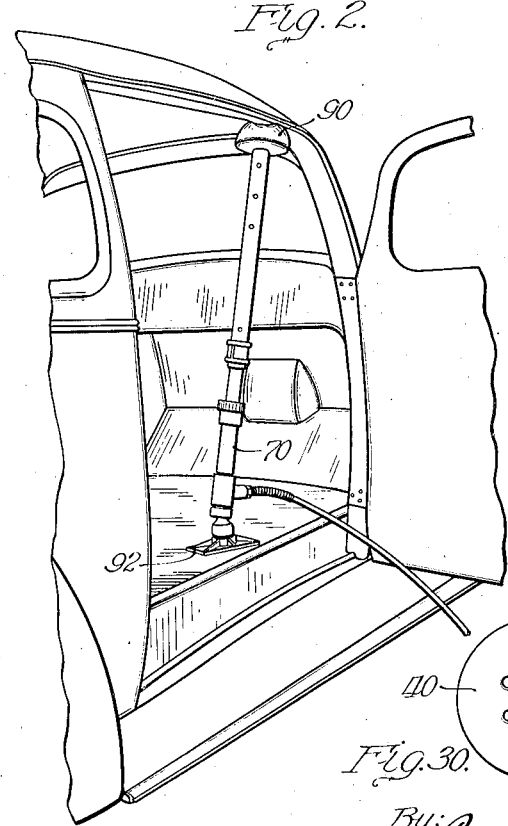
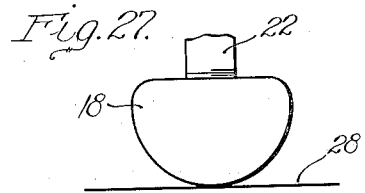
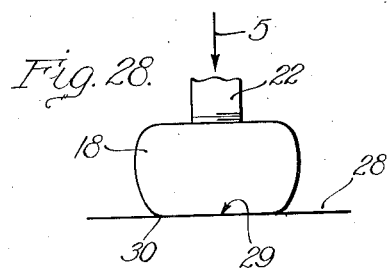
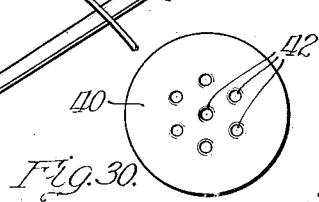

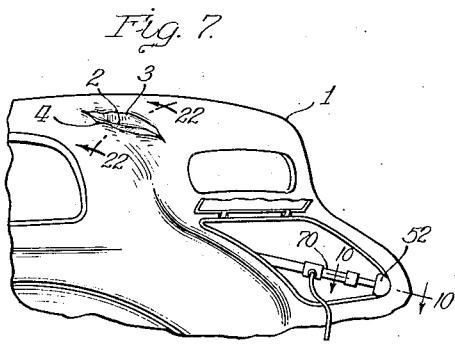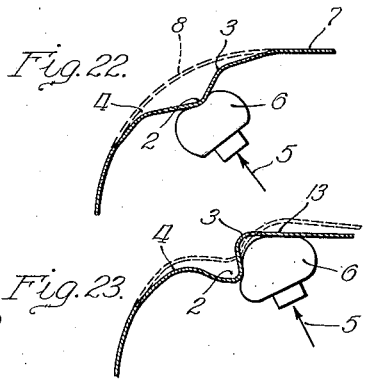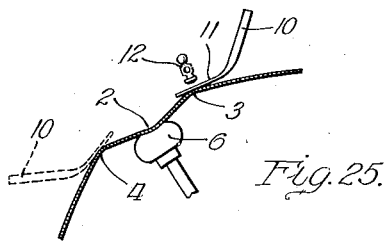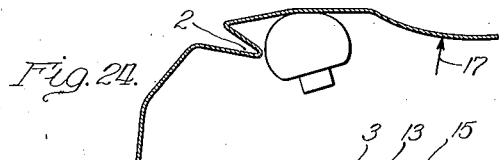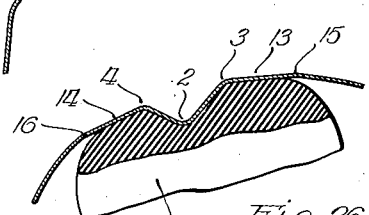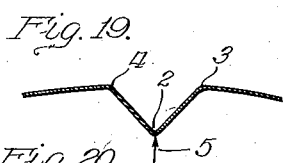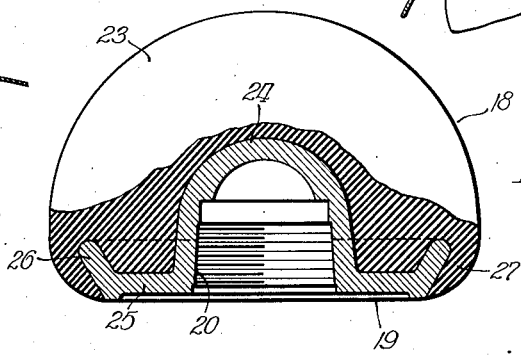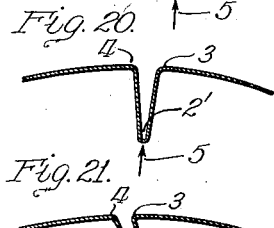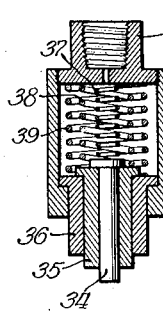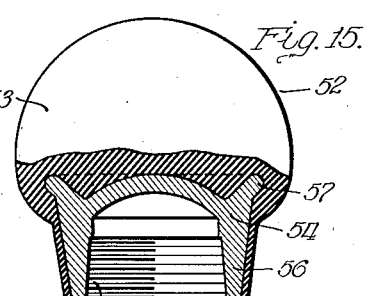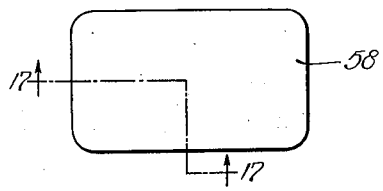

Inventor:
Sigmund Mandl

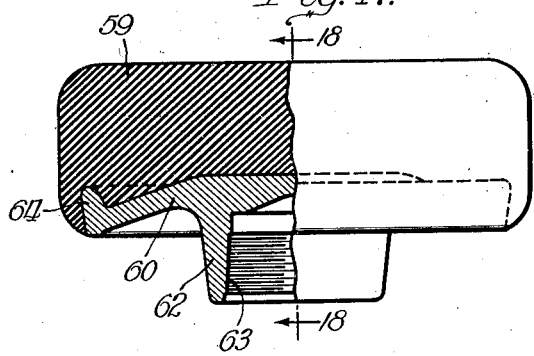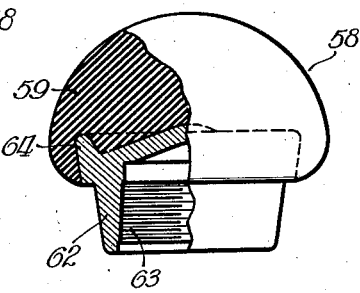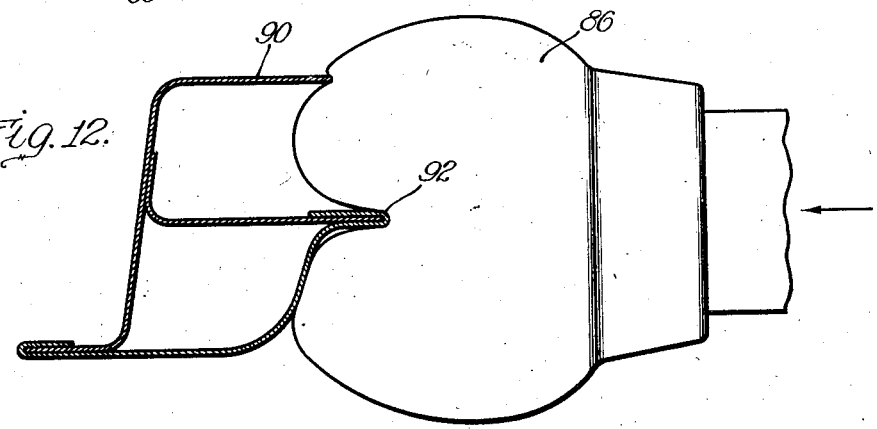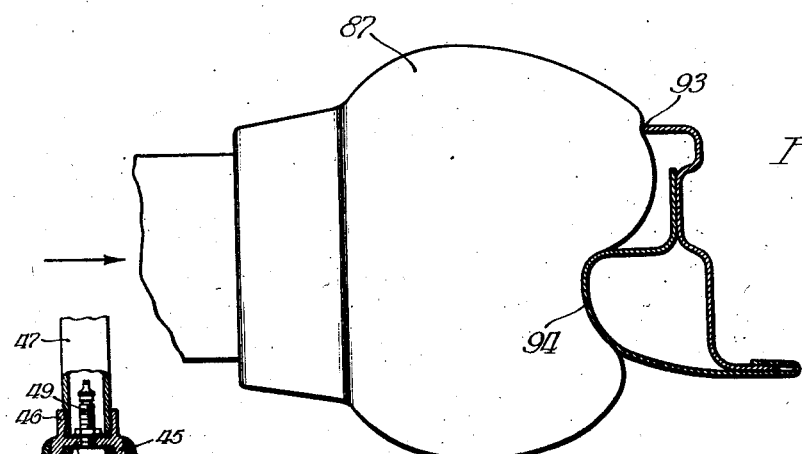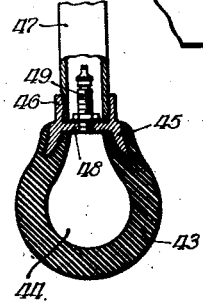

Patented May 7, 1940

2,200,133

UNITED STATES PATENT OFFICE 2,200,133

METHOD OF AND MEANS FOR STRAIGHTENING OUT DEFORMED AUTOMOBILE BODIES AND THE LIKE

Sigmund Mandl, Milwaukee, Wis., assignor to Blackhawk Mfg. Co., Milwaukee, Wis., a corporation of Wisconsin Application January 21, 1937, Serial No. 121,436

9 Claims. (Cl. 153—32)

My invention relates to a method of and means for repairing dented or crumpled sheet metal bodies or shapes such as automobile bodies and the like.

At the speeds at which automobile traffic moves nowadays, a collision generally involves a dented or crumpled body. Steel bodies have come into vogue because of superior qualities, one important quality being greater strength and hence greater safety to the occupants. However, upon the occurrence of damage as by collision, turning over, etc., the steel body presents a problem in reforming or reshaping of the body which is quite different from the previous problem of repairing a body of wooden frame work covered with metal and fabric.

The modern steel body comprises primarily a hollow sheet metal housing, the external surface of which is chiefly made up of convex surfaces. The door openings generally involve steel frames. The window openings, in both the body and the doors, generally involve beading or other reenforcing shapes of sheet metal.

A collision or overturning or injury by external impact usually involves denting in or crumpling a convex sheet metal part, panel, or the like. Also such injury frequently involves wracking of the door frames or of the doors themselves and frequently wracking or deforming the window openings in body or doors.

I have examined many "wrecks," i. e., automobiles involved in collisions and similar accidents, and I have observed the methods adopted for repairs, i. e., the reshaping of the dented, crumpled or deformed bodies, including doors for both the passenger space and for the luggage or like space. The reshaping of fenders presents no great problem. Because of the strength of steel bodies considerable power is required to carry the displaced metal back into shape, and this must be positive and under accurate control. The advent of the hydraulic ram and pump combination marketed by my assignee under the trade-mark "Porto Power" has provided an instrument of precision and power which satisfies the requirements in that direction admirably.

I have conceived that if restoring forces could be applied in the reverse order and reverse direction to those forces which created the deformation, the reformation of the body or other part could be most readily effected.

Heretofore, in straightening out a dented or crumpled part it has been the practice to apply pressure through a metallic presser pad or plate to the deformed part. I have observed that this generally is unsatisfactory for the reason that such a metallic pad puts a highly concentrated pressure upon a part which tends thereby to become deformed in a different manner, thereby merely adding to the final reforming or restoring of the deformed part.

Also it is impossible to have heads or plates that fit all deformed shapes so as to properly distribute the pressure, and as soon as the metal starts back toward original shape, the contour changes. Also it is impossible to have heads or plates that fit all the various contours that the body or other part presents to either the pressure or to the reaction of the jack in effecting straightening.

Next, and equally important, it is impossible to apply a reverse force or succession of forces that approximate the force or forces which effected the original deformation.

Furthermore, with known methods of applying restoring forces as through metallic heads or plates as by a hydraulic or mechanical jack or the like, the moment that the metal starts back toward the original shape, the pressure applied by the jack or the like is lost, and the jack tends to fall out of position unless the resistance of the deformed part itself is resilient enough to hold the jack in place.

A further difficulty which I have observed resides in the slipping of metal heads or pads when pressure is exerted at even a small angle from the vertical against a surface. The surface of the head or pad must be smooth to avoid marring the metal parts to be engaged, and hence metal to metal contact requires pressure to be applied almost normally to the surfaces engaged. Also, in applying pressure to rather delicate shapes, such as a door or window moulding by the use of means known in the art, injury to such shapes is almost invariably occasioned.

Another disadvantage inherent in the use of a rigid metal pad or head is its lack of adjustability, necessitating a multitude of shapes and sizes of heads in order to approximate all of the conditions of deformation encountered in such work. Considerable experimentation failed to produce a head of this type capable of any extensive range of adjustment and consequently greatly limited the adaptability of the machine to the different problems constantly present in metal straightening of this character.

In studying the problem of applying pressures to a large variety of parts or surfaces, no two of which are identical, and avoiding injury or slippage, and also in securing a limited following or resilient pressure so as to effect the desired purpose of applying restoring forces in the reverse order of the deforming or distorting forces, I have observed the peculiar ability of a resilient or similar type of spheroidal head to perform functions which closely approximate what I require, and which is still capable of adapting itself to the endless variety of deformed surfaces encountered.

The resilient spheroid tends to spread its pressure over a suitable area whereby the unit pressure of the engaged area depends upon the "hardness," i. e., the resiliency or elasticity of the head. It tends to imbed minor irregularities of the surface engaged. It resists slippage, i. e., skidding, even though the effective pressure is a thrust at a relatively large angle. Also, if it be employed as an anvil, i. e., as a backing, it will not of itself produce pinching or thinning, i. e., stretching of the metal which is resting against it, if struck a blow by a hammer, unless such blow exceeds the resistance pressure of the head itself. Upon observing that the principle of the spheroidal head appears to lend itself to the straightening of dented or distorted body parts and to the non-slipping or non-skidding qualities, and also to avoiding injury to delicate shapes, I sought practical means for applying that principle to my purposes. I thereupon began the investigation of means to provide a pressure applying member which would embody the aforesaid principles and be usable upon the end of a rod or pipe which could be thrust against a part or surface by a hydraulic or mechanical jack.

By graduating the toughness, density and elasticity of the rubber, it is possible to control the unit pressure which such a body will apply to a surface against which it is pressed.

Since a ball does not lend itself well to attachment to the end of a thrust rod, and since it is necessary in many cases to thrust diagonally against a surface, there remained the problem of how to secure the effect of fixing a ball of rubber, solid or inflated, upon the end of a thrust rod.

I considered cutting a ball into two hemispheres and utilizing only one hemisphere upon the end of a rod or upon a plate. By forming a bond between the flat face of the hemisphere and the flat backing plate, a fairly satisfactory device resulted. However, upon examining the stresses resulting from the use of such a device I found that unduly sharp concentration of stresses upon the outer meeting edges of the rubber and metal resulted. Also, I observed that this tended to pinch the rubber at one edge if the device were applied at an angle to a surface, although it was immensely superior, both in operating characteristics and adaptability, to a flat metal pad or head. By setting a hemispherical body of tough, dense rubber in a shallow socket, the tendency to spread out the flat side was restrained. This considerably improved the performance. However, in both forms, I found that if the head were thrust into a corner the exposed metal backing plate would mar the surfaces which it engaged.

It was then found desirable to cover the edges of the backing plate with rubber to avoid injury to finished parts, particularly in forcing the head into the corner of a frame or the like, and in case the pad dropped against or was bumped against a finished part, or glass or the like.

I was led by my experiments to conclude that the ideal shape would approximate externally a sphere, or a major portion of the same, and that the metal fitting to anchor the end of the thrust rod should, for best results, be embedded in the body of the more or less spherical or hemispherical body of rubber.

The metal restraining rim which forms a part of the metal fitting to which the rubber head is molded lends important characteristics to the action of the head. Without such a rim it would be difficult to design a head capable of building up the pressures required in this art with the comparatively soft rubber composition employed.

By employing a ring or flange of this type embedded in the rubber head adjacent its major cross-section, I find that in effect it produces an annular restraining stratum of rubber, limiting the sidewise flow of the adjacent rubber under pressure, and tends to control the transmission of pressure through the head so that no appreciable shearing stresses are produced at the bond between the rubber head and the fitting. The flange also serves the important function of preventing too great a deformation or flow of rubber, especially when the head is pressed into a corner. This prevents rapid deterioration of the rubber and materially lengthens the life of the unit.

By applying my cushion or head to the straightening or restoring of dented or deformed bodies and parts thereof, a wholly new technique is possible, and a rapidity and excellence of repair never before possible is now available to the art.

In the construction of heads which I have successfully employed for the above service, I have utilized "mechanical stock" rubber which appears to be of a grade substantially the same as that employed on the tread of automobile tires, or perhaps somewhat tougher and denser. This is vulcanized directly to the metal backing member, and is bonded very tenaciously thereto. The head which I employed gave me a unit pressure upon the surfaces engaged of approximately 600 pounds per square inch, which is quite satisfactory for this class of work, although for other types of rubber or similar material this value may be raised or lowered, depending upon the material employed. Obviously, the unit pressure may be varied by graduating the character of the rubber. The load which may be applied by such a spherical face is quite surprising. For example, using a cushion or head of 2½" radius, a pressure of over five tons is readily attainable without injury to the head, and yet the unit pressure of the surface engaged does not materially exceed 600 pounds per square inch. Greater total pressures are attainable, of course, by utilizing a head of larger size.

The actions which I secure by my invention are unique.

1. A heavy thrust may be exerted at an angle to the supporting surface with equal facility in any direction, because of the high coefficient of friction of the surface of the material, the resilience of the material, and because of the convex or spherical shape. Obviously, this capability may be secured in more or less perfect degree by variation in the embodiment of the above characteristics of coefficient of friction of the surface, resiliency of the body, and greater or less variation from the spherical shape.

2. A thrust of self limiting unit pressure may be exerted against surfaces of widely varying character. The unit pressure may be regulated by the choice of material of the pad.

3. Irregularities of surface are imbedded in the face of the cushion thereby avoiding injury or deformation of delicate parts such as beads, mouldings or all parts which can sustain the self-limited unit pressure.

4. By the imbedding function pressures may now be exerted upon deformed metal sections, such as dented automobile bodies in such manner as to approximate the reverse of the forces which caused the deformation, denting or the like.

5. By the resilience of the cushions, a resilient or follow up pressure may be maintained upon a part which is being moved back to original form. This follow up is self limiting because the loss of contact area immediately reduces the total thrust, but keeps the unit pressure substantially uniform upon the remaining surface of contact.

6. The resiliency of the cushion serving as a backing or anvil for straightening out inequalities of the surface over the pad or adjacent the edge of the same not only prevents injury to the metal but in conjunction with the resilient follow up effect secures a wholly new straightening effect.

7. The inconvenience and danger of injury to a workman by slippage of the jack or a part thereof is substantially done away with.

In the metal straightening art, the process of exerting a resilient pressure upon the abnormal inside convexity while flattening by impact or pressure the surrounding abnormal external convexity secures a rapidity and excellence of restoration to the normal or original form which is wholly new in the art.

Where the internal abnormal convexity is of a character which because of the sharpness of the angles involved would likely entail damage to the metal a preliminary step of reducing the angularity may be required before impacting the external abnormal convexity or with a limited amount of impacting thereof to assist the metal in properly or expeditiously unfolding until the simple case above dealt with is presented.

Now in order to acquaint those skilled in the art with the manner of constructing, operating and practicing my invention, I shall describe, in connection with the accompanying drawings, a specific embodiment and mode of use of my invention.

In the drawings:

Figure 2 is a perspective view showing a front door frame of an automobile being straightened by the use of a cushion or head of my invention.

Figure 5 is a side elevational view of the window frame in a door being straightened by a jack using heads of my invention.

Figure 6 is a rear elevational view of an automobile body showing the application of a jack using heads of my invention to straighten out the rear deck opening or luggage compartment opening.

Figure 7 is a perspective view of the rear part of an automobile body, illustrating at the top of the body a dent produced as by turning over, and it shows a jack employing the heads of my invention for pushing the metal of the body outwardly by a force applied to a corner of the goods compartment opening.

Figure 12 is a cross sectional view showing a head of my invention engaging the edge of a window opening in a door, this view being taken on the line 12—12 of Figure 5.

Figure 13 is a cross sectional view of a head of my invention engaging the opposite corner of the window opening in a door, taken on the line 13—13 of Figure 5.

Figure 14 is a side elevational view partly in section showing one form of head of my invention.

Figure 15 is a similar view of a modified form of head.

Figure 16 is a top plan view of a modified form of head, further views of which appear in Figures 17 and 18.

Figure 17 is a quarter section view of the head shown in Figure 16 taken on the line 17—17 of Figure 16.

Figure 18 is an end elevation, partly in section, showing the head of Figures 16 and 17.

Figures 19, 20 and 21 are cross sectional views of different degrees of denting of a sheet metal body.

Figure 22 shows a dent of rather shallow elevation, with the cushion of my invention applied thereto.

Figure 23 shows the head of my invention applied to a dent and fold.

Figure 24 is a cross sectional view showing the head of my invention applied to a dent which has been converted into a reentrant fold.

Figure 25 is a cross sectional view through a part of an automobile body showing the application of the head of my invention to the internal convexity of the dent with simultaneous ironing of the line of external convexity which surrounds or partly surrounds the internal convexity.

Figure 26 is a cross sectional view illustrating the application of a head of my invention to a deformity of a sheet metal body involving a compound dent, several elements of which are simultaneously operated upon.

Figure 27 is a side elevational view illustrating the application of a head of my invention to a flat surface under minimum load.

Figure 28 is a similar view of the head with a fairly heavy load applied thereto.

Figure 29 is a bottom plan view of the head of Figure 28 showing the area of contact with the flat surface.

Figure 30 is a face view of a head such as that shown in Figure 14 or Figure 15, with the outer face thereof formed with recesses to vary the initial unit pressure to an applied surface.

Figure 31 is a longitudinal axial section of a metallic head illustrating the principle of self-limiting unit pressure; and Figure 32 is a longitudinal section of a pneumatic head of my invention.

Figure 1:
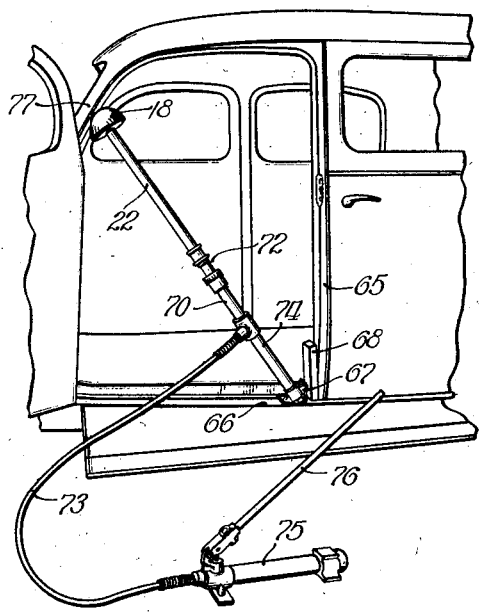
Figure 1 is a side elevational view of an automobile windshield post being straightened by the use of a cushion or head of my invention.

The automotive body, such as the all-steel body of present day use on automobiles, presents, in general, convex external surface of varying radii throughout the body. Damage by collision, turning over, impacts, in fact all the usual accidents, generally involves in some degree denting in of the convex surface to produce an abnormal internal convexity surrounded or partly defined by a line of abnormal external convexity. Thus, for example, as shown in Figure 7 at the upper rear corner of an automobile body, the normal rounded contour, such as obtains at the undamaged corner 1, has been dented in at 2 to form an internal abnormal convexity surrounded or defined in part by external convexity as indicated by the lines 3 and 4.

For a simple shallow dent, the internal convexity may not be of sufficient elevation to be noticeable. In fact, it need not be convex at all. It may be merely a lessening of the normal external convexity which the body or panel normally has at that point. However, such minor dents or deformations present little difficulty and the handling of them will be readily apparent from the following description. It is only when the dent, such as shown at 2 in Figure 7, presents a fairly sharp internal convexity with associated lines of external convexity such as 3 and 4 that the straightening out of the deformation presents difficulty. Such severe denting or deformation generally represents thrusting of the sheet metal edgewise to form a surplus or fold. In general the metal of a body is not much deformed by stretching of the metal but mainly by displacement.

Heretofore, cast iron heads of various form, usually castings having surfaces of cylindrical, planar, wedge-shape, and the like forms, have been employed for forcing such dent, fold or internal convexity outwardly. The unyielding heads of the prior art have been applicable fairly readily to minor dents or simple dents of low elevation and no sharp bends without, of their own application, deforming or producing a secondary deformation of the metal of the body, but where the dent or deformation presents a rather sharp convexity or sharp bends or folds, the unyielding metal heads of the prior art have been wholly unsatisfactory. In Figures 19, 20 and 21, I have illustrated different degrees of indentations or folds. Figure 19 shows an indentation substantially as indicated in Figure 7. The indentation 2 presents on the inside of the body an abnormal internal convexity. Where this joins the normal contour or approximately the normal contour as at 3 and 4, there is produced a line of external convexity, in this case 3 at one side and 4 at the other. It can be seen that if a non-yielding metallic pad or head be applied in the direction of the arrow 5 in Figure 19 to force the internal convexity outwardly or to reduce the same, a very high unit stress may be brought upon the apex of the convexity and a secondary deformation or injury to the sheet metal may be caused.

Where the indentation is accompanied by lateral pressure, such as often occurs when a body is rolled over the ground, the internal convexity, such as 2', shown in Figure 20 may approach or attain a complete fold. Such a fold presents a high degree of resistance to restoration by pressure applied at the apex, that is as indicated by the numeral 5 in Figure 20. In fact, with a rigid unyielding pad, it is very difficult, if not impossible, to restore the fold without either making it worse or additionally injuring the metal. The fold shown in Figure 20 may be displaced laterally, as indicated at 2'' in Figure 21. In this case the application of pressure to the fold, even if normal to the plane of the fold, as indicated by the arrow 5 will tend to injure the metal, not only at the point of application of the pressure, but also will tend to tear the metal at the line 3.

I have conceived the possibility of utilizing a self-distributing application of pressure which will approximate in direction and order of application substantially the reverse of the forces which produced the deformation. In other words, if I could in reverse order and direction produce forces substantially the same as those which produced the deformation or distortion, I could straighten out with minimum punishment of the metal, and with maximum facility, any deformed object, particularly such as an automobile body or part thereof.

Where the injury approximates the form shown in Figure 19, I find that it is possible to apply the yielding self-limiting heads of my invention as indicated at 6 in Figure 22 to the point or apex of the internal convexity and thereby create by pressure along the longitudinal axes of the head 6 as indicated by the arrow 5 sufficient tension and bending in the sheet or body panel 7 to restore the same to approximately its normal contour. Where relatively sharp lines such as 3 and 4 have been produced, it is difficult with the application of pressure laterally of the sheet to produce sufficient bending of the sheet to get the lines 3 and 4 ironed out or eliminated and hence in restoring the original form to the dotted line shown at 8 in Figure 22, I first apply the yielding self-limiting pressure of the head to the apex of the abnormal internal convexity and simultaneously impact the lines of external convexity such as 3 and 4, as illustrated in Figure 25. Impacting is done preferably by means of a tool 10 which consists of a handle portion grasped by the hand of the workman and a flat blade portion 11 which is laid over the crease or line of external convexity, such as 3, and is struck by a hammer, such as 12, in Figure 25. Upon the opposite side, the line or external crease 4 may be similarly treated as pressure is applied by means of the yielding head 6 illustrated in Figure 25, the tool 10 being moved along the line of the crease and struck by the hammer 12 to force the external convexity back into normal alignment with the remainder of the sheet to restore the normal form.

Considering the typical or idealized dent shown in Figure 19, the restoring of the metal to original position involves bending of the metal at the three points 2, 3 and 4. That is to say, restoring is resisted by the resistance to bending back at points 2, 3 and 4. If now pressure is applied as at the point 2, as illustrated in Figure 25, the resistance to restoring may be reduced by ironing, as at 3 and 4. When the bend at 3, for example, is straightened out by impacting while the compressed head or cushion 6 is pushing outwardly at the point 2, the resistance to restoring is reduced and the head or cushion 6 is able to expand and carry the metal outwardly. This provides a very effective and rapid method of removing the dent. Thus, by removing the resistance of the bends 3 and 4 by ironing, as illustrated in Figure 25, the head or cushion 6 expands and throws the metal outwardly, whereby a highly effective and rapid restoration is produced.

Where the indentation is small compared to the size of the head available as shown in Figure 26, the head 6 may envelope or imbed in itself the internal convexity 2 and simultaneously apply pressure to the associated deformed surfaces such as 13 and 14 adjoining the external lines of convexity 3 and 4, respectively, and by so doing, simultaneously apply pressure and tension to the region of maximum deformation, thereby greatly expediting restoring the deformed portion from the point 15 to the point 16 to normal shape.

From the above, it will be apparent that heads of various sizes and various degrees of rigidity of self-limiting unit pressure are desirable.

In the application of the head 6 to the indentation or dent 2, the head 6 does not embed more than the apex of the dent, whereas in Figure 26, the head embeds both the central dent and the surrounding deformed area. The application of pressure to not only the maximum indentation but to the surrounding deformed area is desirable, but not essential in the practice of my method. The heads such as indicated at 6 in Figures 19 to 26, are preferably of the construction shown in Figures 14 to 18, but a wide variation in construction of these heads is possible, as will be described later. The essential qualities of providing a yielding loading of self-limiting character and variable area, depending upon the total load, is secured in these heads. To reduce the internal convexity which is of the degree shown in Figures 20 and 23, a preliminary step of applying pressure adjacent the crease or dent to put the metal of the crease or dent under sufficient tension to unfold the crease or dent is desirable. Consider, for example, in Figure 23, the head 6 is forced in the direction indicated by the arrow 5 against the flattened region 13 and pressure exerted by the head tends to unfold the indentation or fold 2 until it approaches the simple case illustrated in Figures 22 and 25, whereupon it may be treated as the simple case. It is to be noted that in the reducing of the compound to the simple, or in reducing the simple deformation to the normal form, impacting along the lines of external convexity such as 3 and 4 tends to reduce the pressure of the head 6 against the internal convexity, but the resilience and follow-up of the rubber head 6 tends to maintain contact, and by further operation of the jack the pressure may again be raised or maintained or even increased, so that progressively the internal convexity is reduced and the external convexity ironed out in going from the compound deformation to the simplified form of deformation and from the simplified form of deformation back to the normal form. For example, in Figure 23 as the metal is carried from the full line position to the dotted line position impacting along the line 3 may be helpful in accelerating the return of the metal to the simplified form or to the normal form. After the metal has been carried from the full line position in Figure 23 to the dotted line position shown therein, the application of the force may be changed so as to be like that shown in Figures 22 and 25. If the fold is of the type shown in Figure 20 or even Figure 21 pressure upon the sheet at a point to the left or right of the fold or crease in case of the form shown in Figure 20 and preferably to the right of the crease in Figure 21 may preliminarily be applied, for creases as extreme as those shown in Figures 20 and 21 are rarely occasioned without considerable deformation of the metal elsewhere in the body, and in order to put the metal under sufficient tension to unfold the creases shown in Figures 20 and 21, loading of the sheet metal by application of the head 6 at such other point of deformation adjacent to or remote from creases such as shown in Figures 20 and 21 as a preliminary operation are desirable. The use of the heads of my invention for this preliminary operation are equally valuable because it is possible to put a load of self-limiting unit pressure upon the sheet metal, so that it will be put in tension without high concentration of pressure which would overload and hence damage the form in attempting to restore the original form. As shown in Figure 24, a crease so deep as the one indicated is generally accompanied by deformation of the body elsewhere than at the immediate region of the crease, and it is usually possible by applying the pressure of the head at a point such as indicated at the arrow 17 to unfold at least in part the crease 2 and thereby bring it closer to the simplified form or the normal form. It is of course not possible to cause the metal to assume the original external convexity by mere tension of the sheet, since that would be attempting to form the metal into an arc by pulling the metal in the direction of a chord of a circle. Generally, by pressing radially in the direction of the arc which it is intended shall be the final form sufficient tension may be produced in the metal to perform the major part of the work of straightening. If at the same time this pressure is maintained resilient and self-limiting as to unit pressures, ironing as described in connection with Figure 25 rapidly restores the metal to the original form. The structure of a head suitable for performing the above method of restoring the original form of a sheet metal body of a pan or the like is illustrated in Figures 14 to 18.

The head 18 of Figure 14 comprises a generally spherical engaging surface. The contour of the head 18 may be approximately a hemisphere or approximately any part of a sphere, depending upon the service to which the device is to be put, as will be understood from the following explanation. It is generally desirable that the head be more than a hemisphere for the reason that a diagonal thrust on a plane surface or a thrust into or toward a corner may otherwise bring the metal backing into engagement with a surface which will be damaged by the concentrated pressure that the application of the metal backing or insert would bring about. A metal insert 19 which provides the screw socket 20 for the introduction of a piece of pipe, such as the extension 22 shown in Figure 1, carries a body of rubber 23 which is bonded by vulcanizing to the surface of the metal insert. Instead of a screw socket any suitable form of readily detachable coupling for the application of a thrust member may be used. This insert 19 comprises a socket portion 20 the outer end of the socket being closed by a spherical wall 24. A radially extending flange or plate 25 is formed integral with the threaded socket portion 20, and a diagonal or conical wall or flange 26 is formed on the outer margin of the radial flange or plate 25. The elastic body 23, which may be made of rubber, "Duprene," or any other equivalent of rubber, covers and imbeds not only the end of the metal insert 19, but also the sides of the flange 26 as at 27 for the dual purpose of increasing the bond between the body 23 and said insert to restrain the rubber from sidewise flow, and also to avoid contact of the metal insert with finished surfaces, or with glass or the like, either upon accidental impact or where, from the direction of application of force, the metal insert might be brought into contact which would cause injury or denting of the engaged part, as I shall later explain. Also, as above pointed out, the transverse diameter of the resilient body should be great enough to extend beyond the transverse dimension of the backing.

It will be obvious that the head shown in Figure 14 has a substantially uniform depth of rubber radially over the spherical part of the insert 24 and the cylindrical part adjacent the spherical part 24. This uniformity is not strictly necessary. The shape of the rubber may be selected to give any desired law of unit pressure desired, but the generally spherical form for most purposes is important.

I have heretofore referred to the ability of the head to limit the unit pressures and I shall explain this in connection with Figures 27, 28 and 29.

In Figure 27, the stem or pipe 22 is capable of exerting a vertical downward pressure upon the head 18, the convex surface of which rests upon the surface 28, the surface 28 being a flat hard and unyielding surface, such as a block of steel or the like. Now by loading or thrusting the pipe 22 in the direction of the arrow 5, the body of rubber on the head 18 will be deformed. That is to say, the convexity of the engaged face will be reduced to a plane by engagement with the surface 28.

The rubber 23 is in this case known in the trade as mechanical goods grade rubber, which is tough and dense, and which is bonded with great tenacity to the metal insert by vulcanizing, the bond being capable of withstanding very high unit tensions and pressures. As the head 18 is forced downwardly, into the position shown in Figure 28, the area of contact between the head 18 and the plate 28 increases as the loading is increased. The area 29 of contact between the plate 28 and head 18 is illustrated in Figure 29 by the full line circle 30.

By taking measurements of the load and of the areas over which the load was extended, I have found that in the case of a particular shape of head, such as that illustrated in Figure 14 and employing a head five inches in diameter with the thickness of rubber radially substantially 2½ inches, the unit pressure over a wide variety of loads, that is, from zero to substantially five tons remains fairly uniform around 600 pounds per square inch.

Now it can be seen that for a light load a small area is engaged, and as the load become heavier, a greater area is engaged, thus automatically keeping the unit pressure low enough not to injure the metal or other part which the head engages.

The principle of maintaining limited unit pressure over an area which varies in respect to the load is illustrated in a mechanical embodiment in Figure 31. Here a barrel member 32, provided with a pipe socket 33, has a series of concentric plungers 34, 35, and 36 backed up by corresponding springs 37, 38 and 39, respectively. If a downward thrust through the pipe socket 33 be caused to press the plungers successively into contact with a flat surface, it will be seen that as the load increases, the area engaged will be increased, but the unit pressure due to the proportioning of the springs to the area will remain constant or may be varied, as desired. Obviously, instead of concentric plungers any number of parallel plungers of uniform size placed side by side with corresponding backing springs may be employed instead. Such a mechanical embodiment is obviously not capable of performing the various functions which the elastic heads of my invention can perform. Thus, for example, the coefficient of friction of the body of rubber 23 with the smooth metal surface is very high as compared to smooth metal-to-metal contact. Further, the body of rubber 23 will conform itself to the engaged surface, and will not increase the unit pressure, even if the thrust is at an angle. The rubber sphere is subject to very complex stresses, but part of its ability to deform and yet maintain pressures resides in the stretching tension in the central band or zone.

The spherical or approximately spherical shape of the engaging surface and of the body is of importance in using to the best advantage the entire body of rubber in its elastic or resilient properties and in presenting a face which can engage any kind of a surface with the self-limiting feature of the unit pressures and from various angles.

If desired, the increase of area may be accompanied by an increase in the unit pressures. That is to say, the spread of the engaged area for equal increments of load may be greater throughout the first part of the loading, if desired, this being accomplished preferably by the formation of holes, slots or recesses in the engaging face or back of the same. Thus, for example, in the head 40 shown in Figure 30, a series of cylindrical recesses 42 parallel to the axis of the head extend into the spherical face. By this expedient the initial engagement provides a unit pressure lower than that which occurs later, as the head is further compressed. Other expedients may be employed to give either a more rapidly or a less rapidly increasing area of engagement for increments of loading, such as restricting the flow of the rubber by fabric inserts or metallic rims. In Figure 32 I have shown a pneumatic form of head. In this case, a hollow spherical shaped head 43 having a central air space 44 is mounted upon and imbeds a metal backing member 45, which has the tubular threaded neck 46 to which may be connected a pipe coupling 47. Obviously, instead of separate parts 46 and 47, these parts may be made integral. The hollow rubber body 43 is bonded by vulcanization to the metal backing member 45. This backing member 45 has a central plate portion 48 having an axial threaded opening therethrough in which may be disposed a valve and valve stem 49 of the usual type employed for automobile tires and the like. The internal pressure in the cavity 44 tends to stress initially the rubber body 43 and to give it the desired supporting effect. Obviously, where a compressible air cavity 44 is employed, fibrous reinforcing means in the body of the rubber may be employed. The use of the fabric or fibrous material about an air confining cavity is optional. The head shown in Figure 32 is spherical and the neck 46, 47 is approximately cylindrical to receive the usual pipe connection 22 employed in this art. Any other form of coupling of suitable character is contemplated. In Figure 15, I have shown a head of smaller diameter. The transverse diameter of this head is approximately 3″. This head 52 has a substantially spherical body of rubber bonded by vulcanization to the metal backing or reenforcing member 54. An internally threaded pipe socket 55 for receiving the end of a pipe or rod, such as 22 in Figure 1, is provided in the cylindrical extension 56 of the reenforcing member 54. The reenforcing member 54 has the divergent or conical flange 57 performing the same function as the flange 26 shown in Figure 14.

The cylindrical portions 56 and the flange 57 are enclosed within the body of rubber 53, so that substantially the entire exterior surface is of rubber. It will be observed that the ratio of thickness of rubber in the axial direction to the diameter in Figure 15 is greater than that shown in Figure 14. Obviously, in Figure 14, instead of the pipe socket 20 extending entirely within the body of rubber 23, it may lie partially outside the same in a manner similar to but not so pronounced as that shown in Figure 15.

In Figures 16, 17 and 18, I have shown a modification where the head 58 presents a convex surface of a single degree of convexity, except for the rounded corners. That is to say, the body of rubber 59 presents a cylindrical surface to the object to be engaged. Where it is desired to apply pressure along an oblong surface, that is, the development of a line into a surface, such a head as that shown in Figures 16, 17 and 18 may be employed. In this case, the metal reenforcing member 60 has a rearwardly extending boss 62 containing internal pipe threads 63. This metal member 60 has the peripheral flange 64 which preferably, though not necessarily, is conical, as is the case in Figures 14 and 15, and the flange 64 is covered on its periphery with an extension of the body of rubber 59.

The form of the metal insert 60 is in each case selected to give a proper reenforcement to the body of rubber to utilize the body of rubber to its fullest extent as an elastic spring material serving both in compression axially and in tension peripherally.

Figure 3:
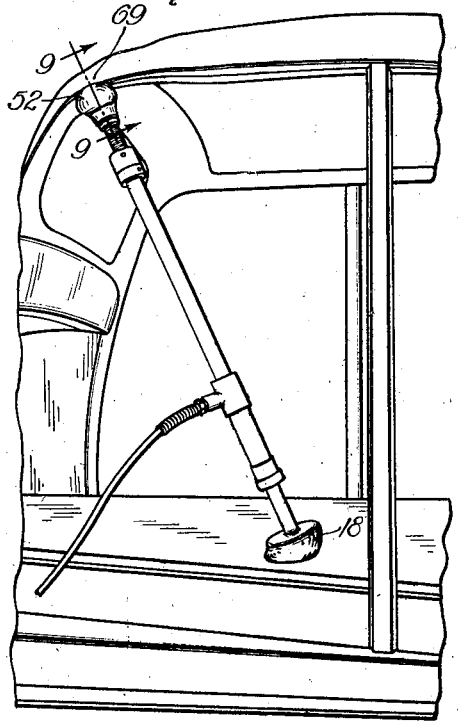
Figure 3 is a side elevational view of an automobile body wherein the junction between the windshield post and the door frame is being thrust upwardly and diagonally outwardly by the use of a jack employing heads or cushions of my invention.

Obviously, the elongated or cylindrical form of pad may be used in the situations illustrated in Figures 19 to 26, where the indentation is of a character to make its use desirable, and the cylindrical form of pad may be employed for engagement against a solid supporting surface such as a floor or the like where the thrust is at a considerable angle, and thereby provide a greater area of engagement with less punishment of the head than is the case where a spherical head is employed. For example, it will be observed in Figure 1 that in order to exert a thrust diagonally towards the corner of the door post 65 and the floor 66 a metal head 67 of known form has been used and wooden blocks may be interposed as indicated at 68 to avoid injury to the engaged surfaces. If a rubber head be employed at this point, the dangerous use of blocks may be avoided without the possibility of marring the surfaces. Also the angle to the corner may be widely varied without injury or slippage. However, if a heavy load is to be placed upon the head thus thrust into a corner, a fairly large size of head, such as that shown in Figure 14, may be required to provide the necessary supporting area. But in the event that the load is heavy, and the head of too small size, the metal reenforcing member 26 in such case may tend to pinch the overlying layer 27 of rubber, and hence the oblong or cylindrical form shown in Figures 16 to 18 may be more desirable for that particular service. Likewise, as shown in Figure 3, the head 18 bearing against the floor and thrusting the body member 69 diagonally upwardly and outwardly will if the load is not too heavy serve admirably because of the high degree of friction and the elasticity of the head 18, but the head of Figures 16 to 18 may well be used in that position. Thus a greater thrust at an angle may be caused by the cylindrical form shown in Fig. 16.

In the application of the head 18 shown in Figure 1, this head is mounted upon the pipe extension 22, which is connected to the hydraulic ram 70 having the plunger 72 and the connecting hose 73. At the opposite end, the pipe extension 74 connects the hydraulic ram with the pad 67 in that illustration. A portable pump and reservoir 75 provided with an operating handle 76 and a suitable control valve (not shown) permit the operation of the ram 70 as desired. The ram is light enough and small enough to be readily handled and placed with one hand, and yet it is capable of exerting a very large thrust or pull under complete control of the operator. This ram and pump combination is disclosed in the copending application of Edward M. Pfauser, Ser. No. 72,750, filed April 4, 1936. Obviously, any form of jack which will exert the desired force may be employed. In those forms of jacks, mechanical or hydraulic, where the reaction of the applied power tends to cause a twist of the jack in its location—that is, where the operating handle of the jack is mounted on the member which transmits the final thrust—the elastic heads of my invention are peculiarly useful in that a resilient and frictional gripping of the surfaces with which they are in engagement tends to prevent accidental dislodgment of the jack by working of the operating handle.

In the application shown in Figure 1, the head 18 engages the surface of a windshield post 77 at quite an angle to the normal, but due to the high coefficient of friction between the parts, an adequate load capable of restoring the post 77 to the desired position may be applied.

Figure 4:
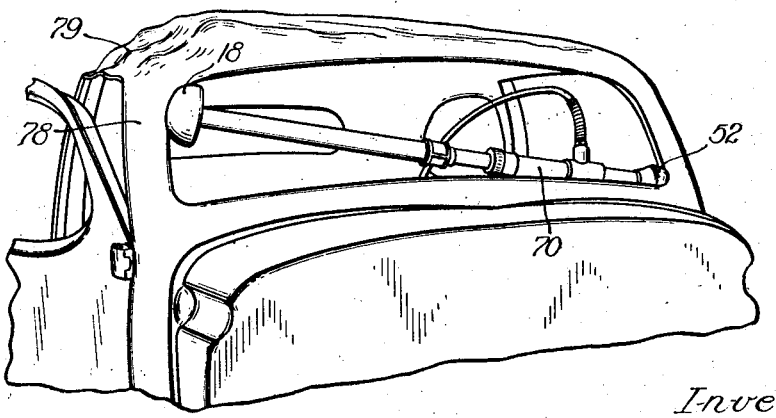
Figure 4 is a perspective view showing the use of a jack employing heads of my invention for straightening out the windshield opening of an automobile.

In Figure 4, I have shown the ram 70 with the heads 18 and 52 applied to the windshield post 78 for restoring the post to the desired position. Thus if the shape of the windshield opening has been deformed, as by the impact indicated at 79 in Figure 4, restoration may readily be accomplished even though it involves exerting a thrust upon irregular metal surfaces, such as the windshield opening presents.

Figure 9:
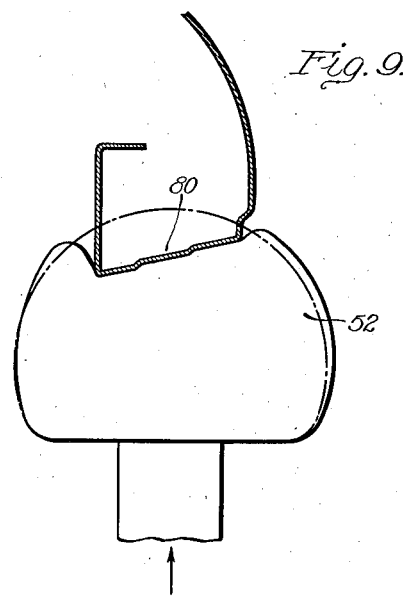
Figure 9 is a cross sectional view showing the head of my invention bearing against the door opening taken on the line 9—9 in Figure 3.

In Figure 3 the head 52 engages the upper corner at the junction of the windshield post and the door frame, the surfaces of the door frame being made up of sheet metal formed as indicated at 80 in Figure 9. The head 52 readily accommodates itself to this irregular shape 80 and without marring or producing added deformations applies the necessary load to restore the parts to the original shape or to force them beyond the same as desired.

Figure 10:
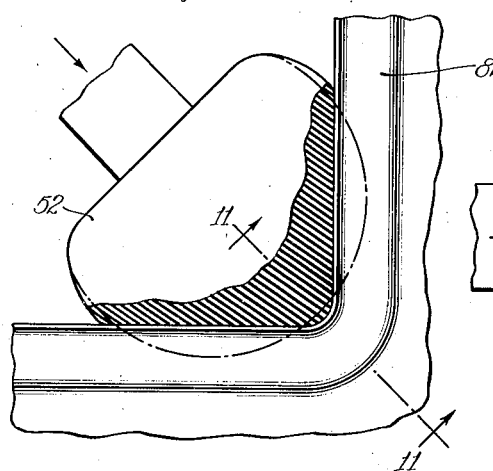
Figure 10 shows a head of my invention engaging a corner of the rear deck opening taken on the line 10—10 of Figure 7.
Figure 11:
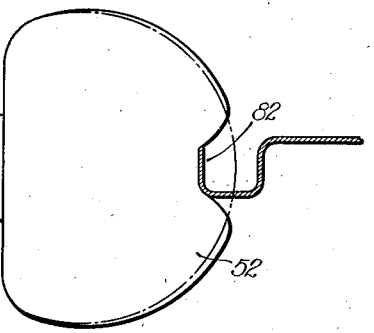
Figure 11 is a cross sectional view taken on the line 11—11, Figure 10, showing the molding surrounding the rear deck opening.

In Figure 7 the jack 70 has applied the head 52 to the corner of the opening into the body for the compartment space. Figures 10 and 11 illustrate the nature of the problem which is there encountered. In this case the head 52 is thrust directly into the corner of the opening as shown in Figures 7 and 10, and even though the metal be of rather delicate shape, the body may be pushed into shape without distortion of the delicate metal configuration shown at 82 in Figures 10 and 11. The rubber of the head is large enough to keep the metal reenforcement from engaging the metal of the part being operated upon.

Figure 8:
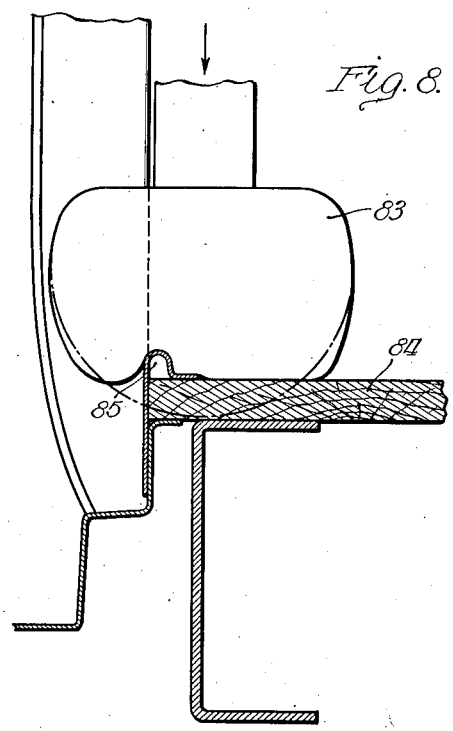
Figure 8 is a cross sectional view through the front door opening of an automobile body showing the cushion or head of my invention bearing against the ornamental bead along the edge of the front compartment floor.

In Figure 8 I have shown how the head 83 which is of the construction heretofore described may engage the floor boards 84 and the metal bead 85 formed at the edge of the floor board in the door opening. Pressure may thus be applied downwardly or at the angle indicated in Figure 1 sufficient to work on the upper contours of the door frame without injury to the bead 85.

It will be seen from these examples that pressure may be applied to metal surfaces against which it has been entirely impossible to bear with the metal or other unyielding heads of the prior art, except at the price of injury to the surfaces engaged. The extent to which these heads may be used for engaging surfaces which otherwise would appear to be quite unsuitable for the application of pressure is further illustrated in Figures 5, 12 and 13. In Figure 5 the ram 70 with the heads 86 and 87 at opposite ends thereof is disposed to thrust the upper part of the window frame in the door 89 to the left. The head 86 engages the sheet metal edges 90 and 92 without injury and may exert a very substantial pressure against them. This pressure is sufficient to bend the frame back into shape. The head 87 likewise engages the sheet metal edge 93 and the curved door molding 94 without injury to them. These heads even though forced into the corners and bearing against delicate shapes or edges are able to reshape parts in a manner never possible heretofore. The embedding qualities of the rubber heads and spreading out of the areas of contact with the load to make the unit load self-limiting are the chief factors which permit this to be done.

Figure 6 shows the counterpart of what is indicated in Figure 5 to restore to the desired shape the rear deck opening. The nature of the metal surface is indicated at Figures 10 and 11. In Figure 2 I have indicated the rubber head 90 as engaging the top of the front door frame of the automobile, the lower end of the jack in this case being provided with a pivoted bearing plate 72 to indicate that where a firm support is secured for the operation of the jack substantially normal to the line of thrust the jack may be employed with a metal head or pad, but it can be seen at once that the degree of angularity is greatly limited, and the service performed by the metal pivotally connected to the pad 92 could much better and with a greater degree of safety be performed by one of the elastic heads of my invention, as indicated in Figure 3.

While I have described in detail the application of the heads of my invention to the reformation or restoring of automobile bodies, I do not intend to limit the invention to this particular service, except as specifically stated in the appended claims, and I intend that the invention shall be considered as applicable to the analogous uses which will at once be apparent to those skilled in the art, and with the modifications and variations in the embodiment and application of my invention which will be apparent to those skilled in the art.

I claim:

1. A pressure member for use in bending the distorted sheet metal of automobile bodies and the like to restore them to substantially their original shapes comprising, in combination, a base member having a central convex surface and a peripheral flange, said member having a socket for detachably receiving a thrust rod and a well rounded convex pad of elastic rubberlike material bonded to said convex surface of said base and being of a size large enough to apply enough force to a deformed sheet metal part of an automobile body at a limited unit pressure to restore the same to normal form without secondary deformation caused by the application of the force, the body of rubberlike material extending radially beyond said flange to protect the same from contact with other objects.

2. A pressure member for use in bending the distorted sheet metal of automobile bodies and the like to restore them to substantially their original shapes comprising, in combination, a metal backing member having a threaded socket for receiving a thrust rod, a conical marginal flange and a well rounded convex body of solid rubber bonded to the member and extending over the flange.

3. The device of claim 2 wherein the backing member is oblong in horizontal section where the axis of the threaded socket is vertical, and the axially projecting surface of the pad is substantially semi-cylindrical.

4. A pressure member for use in bending distorted sheet metal members and the like to restore them to substantially their original shapes comprising, in combination, a metal fitting having a socket at one end for mounting on metal bending pressure applying means and having a central convex portion and a conical marginal flange at the other end, and a unitary rubber pressure applying head entirely covering said convex portion and said flange and intimately secured to the surface thereof, said rubber pressure applying head being generally semi-spherically shaped, the apex of the cone of which said conical marginal flange is a part and the center of curvature of the outer surface of said semispherically shaped pressure applying head lying below the surface of said convex portion.

5. Method of taking a dent out of sheet metal which comprises engaging the convex part of the dent with a cushion of elastic resilient material which is free to expand laterally when pressure is exerted endwise upon the same and thereby to limit the unit pressure upon the engaged metal, applying pressure to said elastic cushion to deform it and to impose a resilient pressure upon the convex face of the dent, and while holding the applied pressure impacting the metal along the margin of the dent to reduce the resistance of the metal to unfolding and straightening, said reduction in resistance allowing the elastic cushion to expand and push the metal of the dent toward unfolded position.

6. Method of removing from a sheet metal body a dent such as occurs in a damaged automobile body, which comprises engaging the convex side of the dent with a relatively thick cushion of tough elastic resilient rubber-like material which is free to be compressed endwise and to expand sidewise by pressure applied to it in the direction of forcing out the dent, applying pressure to said cushion to cause it to partially embed said dent in the face of the cushion and to expand the cushion sidewise, and while holding said pressure impacting the margin of the dent to remove some of the resistance of the dent to unfolding, said reduction of resistance allowing the elastic cushion to expand and push the metal of the dent toward unfolded position.

7. In the method of restoring to substantially its original form the thin sheet metal wall of an automobile body which has been dented inwardly and which dent comprises a depressed portion surrounded by a line of inward bend, the novel combination of steps which comprises engaging the inner surface of the depressed portion with a thick convex elastic body of substantially homogenous resilient rubber-like material deformable by unit pressure less than that which will create permanent local distortion of the thin sheet metal wall to which it is applied and being free to expand laterally, progressively forcing said elastic body against said wall over a part at least of said depressed portion to create pressure against the deformed portion and simultaneously stressing said elastic body by flattening and expanding the same, whereby power to expand endwise is stored in said elastic body, and while holding said elastic body so stressed impacting the metal of the wall at the line of the bend to reduce the bend, said reduction of the bend at the line of bend so impacted reducing the resistance to deflection toward normal and permitting the stressed body to expand endwise and to carry the adjacent depressed portion outwardly toward its original position.

8. In the method of restoring a thin metal wall of originally generally convex form which has been dented inwardly, such dent comprising a depressed portion bounded by a line of bend in the metal wall, the novel combination of steps which comprises engaging the inner surface of the depressed portion with a tough elastic cushion of resilient rubber-like material which has a convex working face, said cushion being free to expand laterally as it is flattened by endwise pressure, progressively forcing said elastic cushion against said deformed portion to produce partial straightening out of the dent and simultaneously stressing said convex elastic cushion by flattening and spreading and storing power therein, and while holding said elastic cushion so stressed impacting the metal at the boundary line of bend to reduce the bend, said reduction of the bend at the place of impacting permitting the stressed cushion to expand endwise and to carry the depressed portion outwardly toward its original position.

9. Method of removing a dent from sheet metal such as the body of an automobile, which comprises engaging the innermost portion of the dent with the convex face of a cushion of tough resilient elastic rubber-like material shaped like a segment of a ball, pressing the cushion against the dent with a force sufficient to flatten the cushion against the dent and holding it there, then hammering the margin of the dent to partially straighten the metal and remove a part of the resistance of the dent to straightening, said removal of resistance allowing the cushion to expand and further straighten out the dent.

SIGMUND MANDL.